(12) United States Patent
Bartel et al.

(10) Patent No.: US 9,498,915 B2
(45) Date of Patent: Nov. 22, 2016

(54) FABRICATION OF REINFORCED THERMOPLASTIC COMPOSITE PARTS

(71) Applicant: The Boeing Company, Chicago, IL (US)

(72) Inventors: Aaron W. Bartel, Mountlake Terrace, WA (US); David E. Gideon, Edmonds, WA (US); Michael H. Larson, Mercer Island, WA (US)

(73) Assignee: The Boeing Company, Chicago, IL (US)

( * ) Notice: Subject to any disclaimer, the term of this patent is extended or adjusted under 35 U.S.C. 154(b) by 584 days.

(21) Appl. No.: 13/732,624

(22) Filed: Jan. 2, 2013

(65) Prior Publication Data
US 2014/0183784 A1 Jul. 3, 2014

(51) Int. Cl.
| | | |
|---|---|---|
| *B29C 70/46* | (2006.01) | |
| *B29C 51/02* | (2006.01) | |
| *B29C 70/50* | (2006.01) | |
| *B29D 99/00* | (2010.01) | |

(52) U.S. Cl.
CPC ............ *B29C 51/02* (2013.01); *B29C 70/50* (2013.01); *B29D 99/0003* (2013.01)

(58) Field of Classification Search
CPC ..... B29C 43/26; B29C 43/265; B29C 43/30; B29C 43/305; B29C 51/02; B29C 51/24; B29C 70/345
See application file for complete search history.

(56) References Cited

U.S. PATENT DOCUMENTS

| | | | | |
|---|---|---|---|---|
| 2,672,070 A | * | 3/1954 | Forster | 411/438 |
| 3,058,154 A | * | 10/1962 | Howard | B29C 51/004 156/222 |
| 3,346,686 A | * | 10/1967 | Collins | B29C 44/24 156/78 |
| 3,351,977 A | * | 11/1967 | Gasch et al. | 72/190 |
| 4,009,981 A | * | 3/1977 | Rosen | B29C 51/18 425/384 |
| 4,044,188 A | * | 8/1977 | Segal | 428/297.4 |
| 4,232,077 A | * | 11/1980 | Meisel | 428/174 |
| 4,306,856 A | * | 12/1981 | Arippol | 432/8 |
| 4,308,005 A | * | 12/1981 | Zundel | B29C 51/445 425/302.1 |
| 4,360,491 A | * | 11/1982 | Holden, Jr. | B29C 51/082 264/294 |
| 4,369,157 A | * | 1/1983 | Conner | B29C 45/14688 264/246 |
| 4,426,065 A | * | 1/1984 | Komatsuzaki et al. | 264/45.9 |
| 5,482,667 A | * | 1/1996 | Dunton et al. | 264/136 |
| 5,618,486 A | * | 4/1997 | Yoshimi | B29C 44/5636 264/321 |
| 6,872,343 B2 | | 3/2005 | Edwards et al. | |
| 7,807,005 B2 | | 10/2010 | Rubin et al. | |
| 7,871,553 B2 | | 1/2011 | Rubin et al. | |
| 2001/0048175 A1 | | 12/2001 | Edwards et al. | |
| 2007/0175571 A1 | * | 8/2007 | Rubin | B29C 70/525 156/196 |
| 2007/0175575 A1 | | 8/2007 | Rubin et al. | |
| 2008/0036107 A1 | * | 2/2008 | Yeung et al. | 264/40.1 |
| 2011/0206906 A1 | | 8/2011 | Rubin et al. | |

FOREIGN PATENT DOCUMENTS

| | | |
|---|---|---|
| FR | 2639867 A1 | 6/1990 |
| GB | 2113140 A | 8/1983 |

* cited by examiner

*Primary Examiner* — Matthew Daniels
(74) *Attorney, Agent, or Firm* — Miller, Matthias & Hull LLP

(57) ABSTRACT

A method of fabricating a reinforced thermoplastic composite part comprises moving a laminate of reinforcing fibers embedded in a thermoplastic matrix for sequential operations through a heating station and then a forming station. The heating station is used to soften the thermoplastic matrix in a portion of the laminate while the forming station is used to impart a geometry to a portion of the laminate whose thermoplastic matrix had just been softened. The softening and the forming are performed simultaneously on different portions of the laminate.

13 Claims, 4 Drawing Sheets

FABRICATION OF REINFORCED THERMOPLASTIC COMPOSITE PARTS

BACKGROUND

In the aerospace industry, it is desirable to use composite parts made of reinforcing fibers embedded in a thermoplastic matrix. Parts made of reinforced thermoplastic composite materials may have smaller strength reductions at higher in-service temperatures than parts made of reinforced thermoset composite materials. Reinforced thermoplastic composite materials have higher toughness, including fracture toughness and Interlaminar Tension Strength (ILT), than reinforced thermoset composite materials.

Thermoplastics also offer certain advantages with respect to plies of reinforcing fibers pre-impregnated with resin. Unlike thermoset materials, thermoplastic materials do not have a shelf life and do not require refrigeration prior to processing. Thermoplastic materials also do not produce significant volatiles during consolidation.

However, current technology is not efficient at forming large integrally stiffened composite parts with continuous or long discontinuous (stretch broken) fiber reinforcement and thermoplastic resin. The scale of the equipment required to fabricate such parts can be impractical to operate and challenging to reconfigure.

SUMMARY

According to an embodiment herein, a method of fabricating a reinforced thermoplastic composite part comprises moving a laminate of reinforcing fibers embedded in a thermoplastic matrix for sequential operations through a heating station and then a forming station. The heating station is used to soften the thermoplastic matrix in a portion of the laminate while the forming station is used to impart a geometry to a portion of the laminate whose thermoplastic matrix had just been softened. The softening and the forming are performed simultaneously on different portions of the laminate.

According to another embodiment herein, a method comprises moving a ply stack of reinforcing fibers pre-impregnated with thermoplastic resin sequentially through consolidating, heating and forming stations to consolidate the plies into a laminate, soften thermoplastic resin in the laminate without causing the resin to flow, and impart a part geometry. The consolidating, softening, and forming are performed simultaneously on different portions of the laminate.

According to another embodiment herein, a fabrication system comprises a heating station for softening a thermoplastic matrix of a reinforced thermoplastic composite laminate; a forming station for imparting a geometry to a portion of the laminate whose thermoplastic matrix had just been softened; and a conveyor for moving the laminate sequentially through the stations so that the softening and forming are performed simultaneously on different portions of the laminate.

These features and functions may be achieved independently in various embodiments or may be combined in other embodiments. Further details of the embodiments can be seen with reference to the following description and drawings.

DETAILED DESCRIPTION

Figure 1:
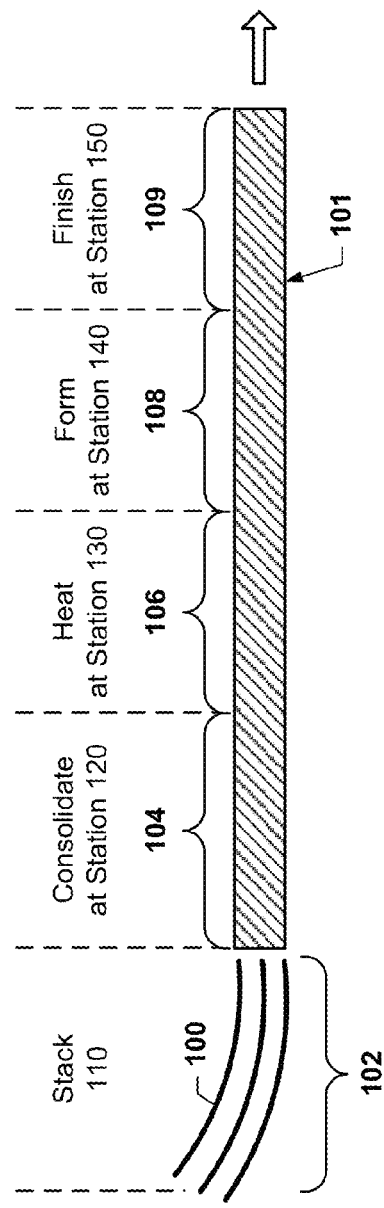
FIGS. 1 and 2 are illustrations of methods of forming reinforced thermoplastic composite parts.

Reference is made to FIG. 1, which illustrates a method of fabricating a reinforced thermoplastic composite part. The part includes plies of reinforcing fibers embedded in a thermoplastic matrix. Examples of the reinforcing fibers include, but are not limited to, carbon fibers, glass fibers, and Kevlar® aramid fibers. The reinforcing fibers may be continuous, woven, chopped, or stretch broken in form. Examples of the thermoplastic include, but are not limited to, Polyetherimide (PEI), Polyphenylene Sulfide (PPS), and Polyaryletherketones (e.g., PEEK, PEKK).

The method of FIG. 1 involves forming a ply stack 101 and moving the ply stack 101 (in the direction of the arrow) through a sequence of stations 120-150 while performing operations at each of those stations 120-150. The operations include, but are not limited to, consolidating, heating, forming, and finishing. These operations are performed in sequence. However, these different operations may be performed simultaneously on different portions of the ply stack 101.

At station 110, plies 100 of reinforcing fibers are stacked up to form an unconsolidated portion 102 of the ply stack 101. In some embodiments, plies 100 are pre-impregnated with a thermoplastic resin, and these "pre-pregs" are stacked up on a forming tool. In other embodiments, plies 100 of dry fibers are interleaved with sheets of thermoplastic film. There is no need to refrigerate thermoplastic materials prior to stacking.

The unconsolidated portion 102 of the ply stack 101 is moved to a consolidating station 120 for consolidation into a laminate 104. The consolidation is performed under sufficient pressure and temperature to remove voids in the resin and consolidate the plies 100 together. The temperature is sufficient to soften the thermoplastic resin without causing it to flow. Issues commonly associated with the curing of thermoset composites (e.g., vacuum bagging, volatiles creating porosity in the consolidated laminate, and environmental, health, and safety concerns about evolved gasses) are minimized or essentially eliminated.

The ply stack 101 is moved until the laminate 104 arrives at a heating station 130. The heating station 130 is used to soften the thermoplastic matrix in the laminate 104 without causing it to flow. The heating at this point will facilitate the subsequent forming of the laminate 104.

The ply stack 101 is moved again until the heated laminate 106 arrives at a forming station 140. The forming station 140 is used to impart a geometry to the heated laminate 106 (whose thermoplastic had just been softened) to produce a formed laminate 108. The forming may be performed in a single stage or multiple stages. As an example of multi-stage formation, first-stage tooling may impart the same geometry in every detail, but final-stage tooling may add geometry to only certain details. The multi-stage forming may be performed as a multi-shot stamping operation, where stamping tools are used sequentially.

Consider the fabrication of a plurality of integrated stiffeners. First-stage tooling stage stamps the same geometry in each stiffener. Final-stage tooling stamps additional geometry only in certain stiffeners, resulting in stiffeners having variable heights. The final stage adds stiffness by changing the geometry of the stiffener itself without adding any additional material to it (thus making the stiffener "integrated").

The tooling may be integrally heated during forming. The tooling may be heated to build up crystallinity of the polymer in the final part. The heating also promotes slight ply "slippage", instead of moving heated (e.g., potentially 700° F.) thermoplastic material into a cold tool where the material would be instantly frozen, and where internal stresses would then be concentrated.

If only single-stage tooling is used, the tooling may be maintained at a temperature below the melt point of the thermoplastic. This would cool the heated laminate 106. If multi-stage tooling is used, the first-stage tooling may be maintained at a temperature slightly below, at, or above the melt point of the material, and the final-stage tooling may be maintained at a temperature below the melt point of the thermoplastic material. These temperatures would cool the heated laminate 106, but still allow for forming.

Processing parameter such as temperatures, and feed rate are not limited to any particular values. These parameters are a function of resin material, fiber material, number of plies in the stack, etc. In some embodiments, the tooling may move along with the heated laminate 106 as the heated laminate 106 is being formed.

The ply stack 101 is moved again until the formed laminate 108 arrives at a finishing station 150. At this station 150, attachment features may be added to the formed laminate 108 to produce a finished portion 109 of the part. Attachment features include, but are not limited to, inserts, bushings, and heli-coils. Other operations may be performed at the finishing station 150, including, but not limited to, trim, nondestructive inspection (NDI), and dimensional inspection.

Some or all of these operations may be performed simultaneously on different portions of the ply stack 101. For example, the attachment features may be added to the formed portion 108, while another portion 108 is being formed, while another portion 106 is being heated, while another portion 104 is being consolidated.

This method enables the fabrication of an elongated thermoplastic consolidated part without having to consolidate the entire part at the same time, and then heat the entire part at the same time, and then form the entire part at the same time. This, in turn, enables smaller machines to be used to perform the operations. Since the machines are smaller, the problem of heating larger machines is avoided. This method is especially useful for the fabrication of large composite parts having complex geometries, such as an integrally stiffened parts having continuous or stretch broken fiber reinforcement.

In some embodiments, the unconsolidated ply stack 102 is completely formed before it is moved to the consolidating station 120. In other embodiments, however, plies 100 could be stacked as the other operations (consolidation, heating, and forming) are being performed. For example, a 30 foot long part could be fabricated by a piece of equipment that is 20 feet long. By the time the formed laminate 108 arrives at the finishing station 150, the plies 100 for the last 10 feet of the part have yet to be stacked up. Thus, these other embodiments allow even longer parts to be formed.

A method herein is not limited to the embodiment of FIG. 1. For example, some embodiments may not include the consolidating station.

Figure 2:
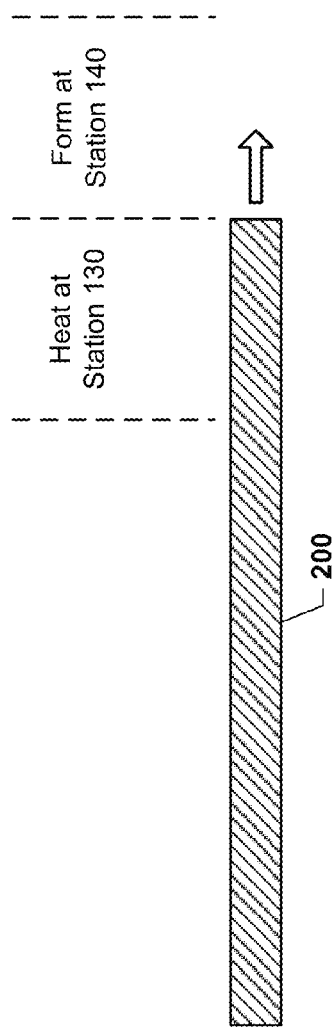

Reference is now made to FIG. 2, which illustrates an embodiment of a method that does not include a consolidating station. The method of FIG. 2 starts with a laminate 200 of reinforcing fibers in a thermoplastic matrix. The laminate 200 may be purchased from a supplier or consolidated in a separate process.

At station 130, the laminate 200 is heated to soften a portion of the thermoplastic matrix. At station 140, the softened portion is formed. The softening and forming may be performed at the same time on different portions of the laminate 200. Finishing (not shown) may also be performed on the laminate 200.

Figure 3:
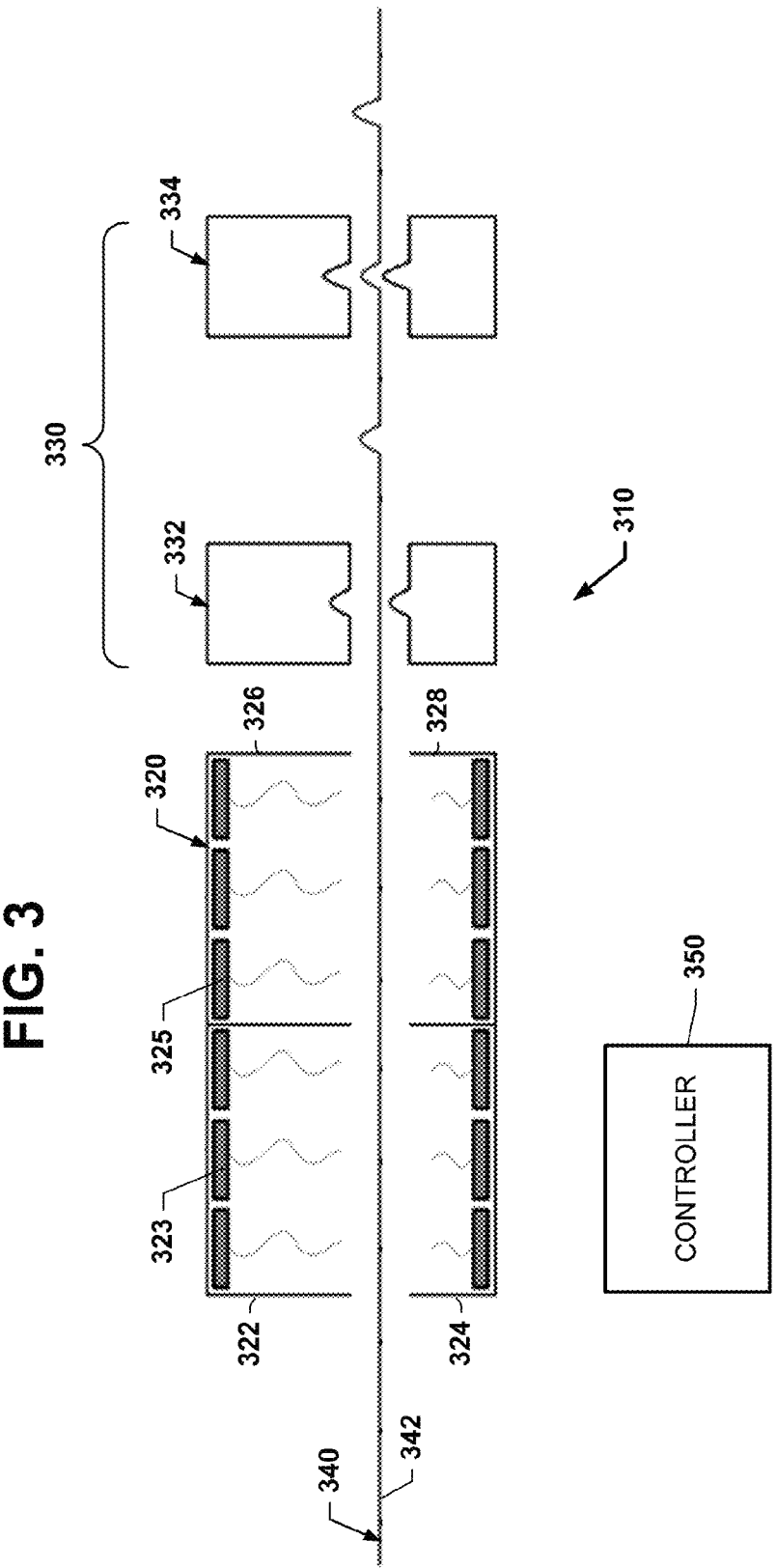
FIGS. 3 and 4 are illustrations of systems for forming reinforced thermoplastic composite parts.

Reference is made to FIG. 3, which illustrates a system 310 for performing the method of FIG. 2. The system 310 includes a heating station 320, a forming station 330, and a conveyor 340 for moving a laminate (not shown) to the heating station 320 and then the forming station 330. The conveyor 340 may include a belt 342 that moves the laminate. The conveyor 340 may move the laminate in pulses. That is, the conveyor 340 advances portions of the laminate from one station to the next, and stops until the operations at both stations 320 and 330 have been completed.

In some embodiments, the belt 342 may include a flexible polymer film having the same geometry as the laminate. The laminate rests on the film during heating and forming. The film may be clamped to keep it taut during the heating and forming. The film may be Kapton® polyimide film or other film that remain stable at thermoplastic-melt temperatures.

The heating station 320 may include banks of heating elements 323 and 325 for emitting infrared energy that softens the thermoplastic matrix of a composite thermoplastic laminate. In the alternative, a convection oven may be used. However, banks of infrared heating elements 323 and 325 are generally smaller than convection ovens.

The embodiment of FIG. 3 shows a heating station 320 that is divided into upper and lower pre-heating zones 322 and 324, and upper and lower heating IR zones 326 and 328. Preheating reduces the risk of damage to the laminate, and it decreases heat up time in the heating zones 326 and 328. The use of both upper zones 322 and 326 and lower zones 324 and 328 ensures that both the top side and bottom sides of the laminate are uniformly heated.

The forming station 330 of FIG. 3 includes first and second tool sets 332 and 334 for performing a multi-shot stamping operation. The second tool set 334 may be used to impart a deeper draw or more complex geometries. The second tool set 334 may add stiffness by changing part geometry without adding any additional material.

The tool sets 332 and 334 may be integrally heated. For example, the tools of the sets 332 and 334 may be made of steel, and heating elements may be embedded in the steel tools.

Thin laminates will cool rapidly after leaving the IR heating zones 326 and 328. Therefore, it is desirable to place the heating and forming stations 320 and 330 as close together as practical to minimize heat loss. Insulation may be placed between the heating and forming stations 320 and 330 to further minimize heat loss.

The system 310 may also include a controller 350 for controlling the operation of the heating station 320, the forming station 330 and the conveyor 340. Operations controlled by the controller 350 include, but are not limited to controlling position and speed of the conveyor 340, temperatures in the heating station 320, and temperature, pressure, and hold times of the tool sets 332 and 334. Inputs to the controller 350 may be provided by sensors such as thermocouples, pressure transducers, and optical sensors.

Figure 4:
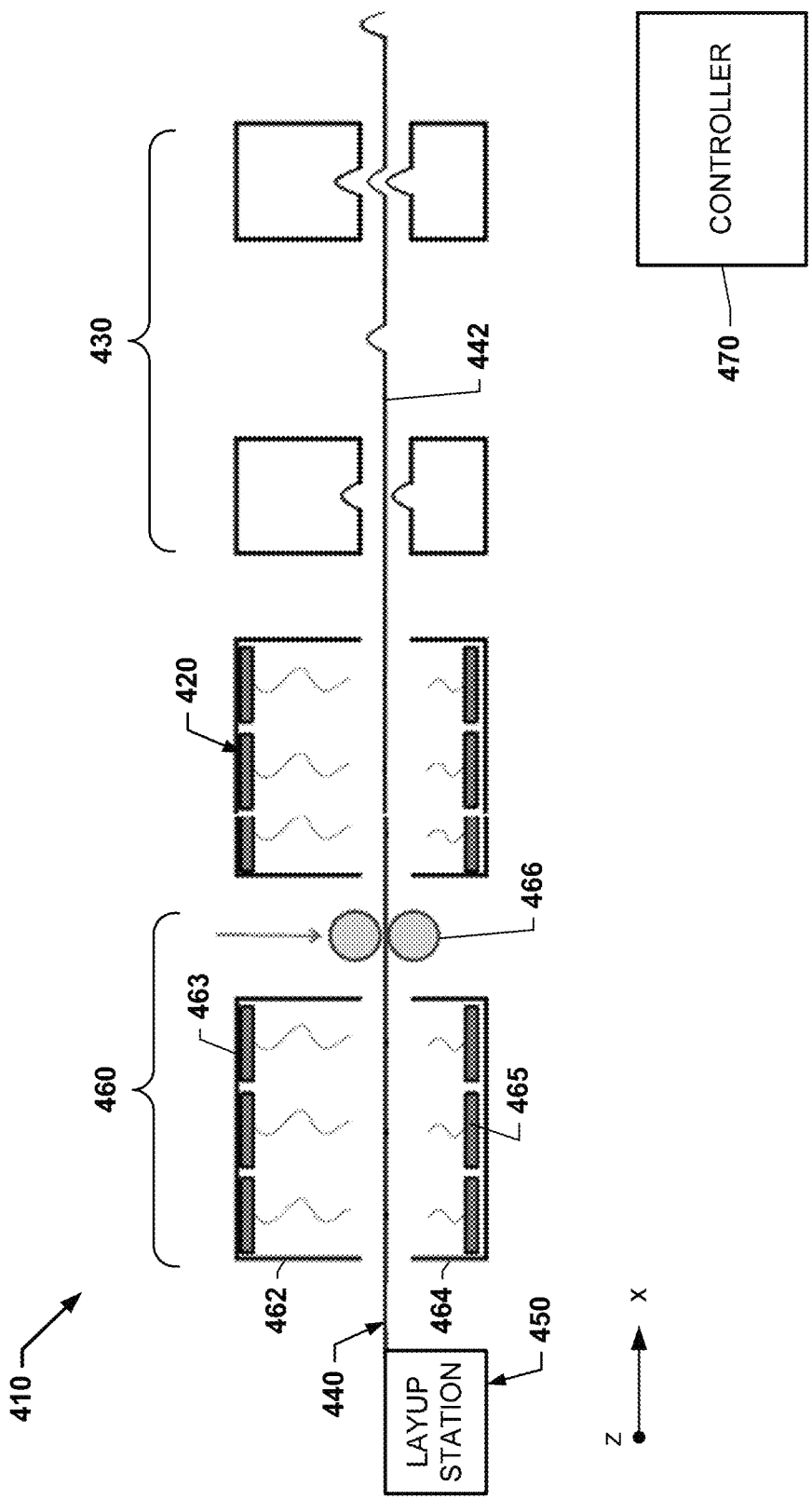

Reference is made to FIG. 4, which illustrates a system 410 for performing the method of FIG. 1. The system 410 includes a heating station 420, a forming station 430 and a conveyor 440. The system 410 further includes a layup station 450 for laying up unconsolidated material. Parameters include ply count, ply orientation, ply splice locations, and ply tack frequency and location. Unconsolidated material may be laid up by hand or machine. Automated layup may be performed, for example, by a continuous tape laminator. Manual layup may include tacking the unconsolidated material (e.g., with a heat gun).

The system 410 further includes a consolidating station 460, which may include upper and lower zones 462 and 464 of infrared elements 463 and 465 that apply heat to the unconsolidated material, and it may include rollers 466 for applying pressure to the unconsolidated material. The rollers 466 may be heated to a temperature at or above the melting point of the thermoplastic resin. The resulting laminate is then fed to the heating station 420.

If the conveyor 440 includes a belt 442 made of flexible polymer film such as a Kapton® polyimide film, the film may stick to the ply stack during consolidation. The film may be peeled from the part after the part has been formed.

The system 410 further includes a controller 470 for controlling operation of the conveyor 440, consolidating station 460, heating station 420 and forming station 430. Operations controlled by the controller 470 include, but are not limited to controlling conveyor position and speed, temperatures in the heating station 420, temperature, speed and pressure of the consolidation rollers 466, and tooling temperature, pressure, and hold times. Inputs to the controller 470 may be provided by sensors such as thermocouples, pressure transducers, and optical sensors. If automated layup is performed, the controller 470 may also control the layup station 450.

Figure 5:
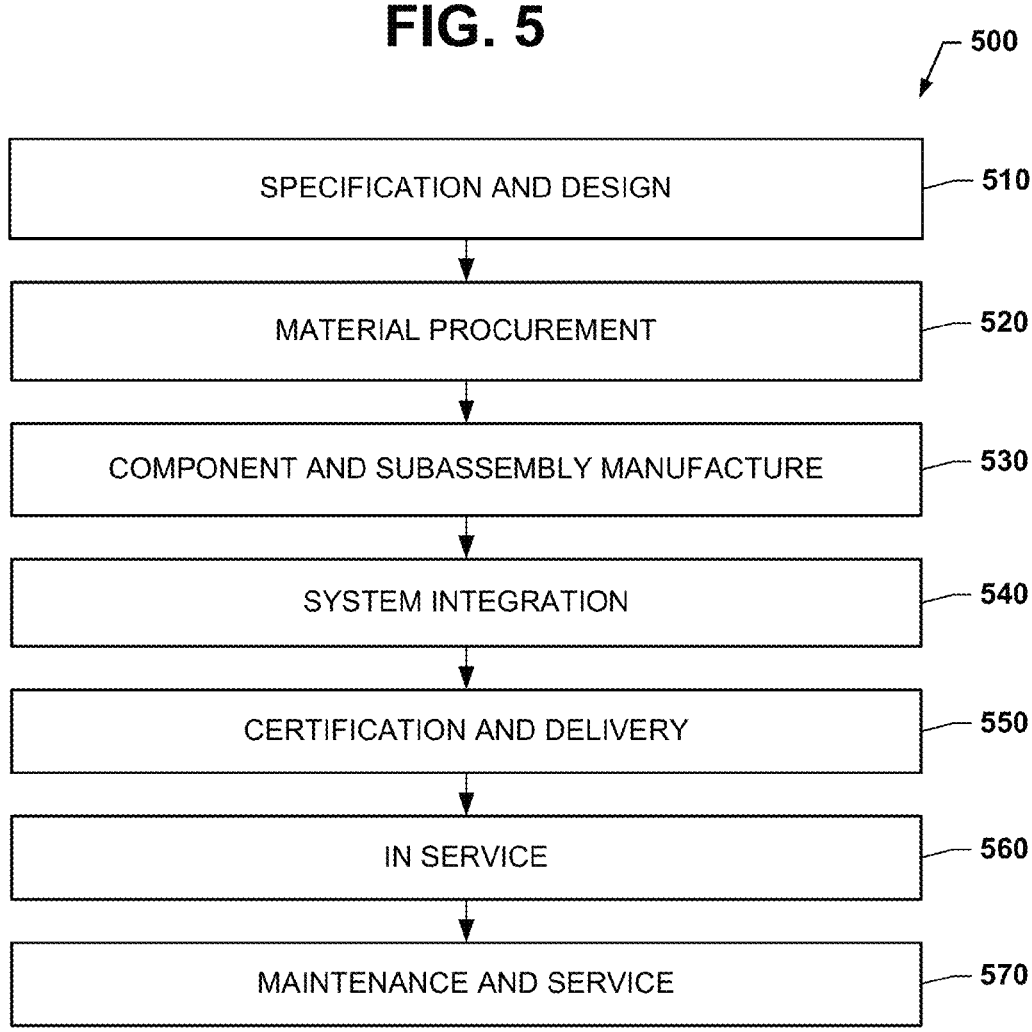
FIG. 5 is a flow diagram of aircraft production and service methodology.
Figure 6:
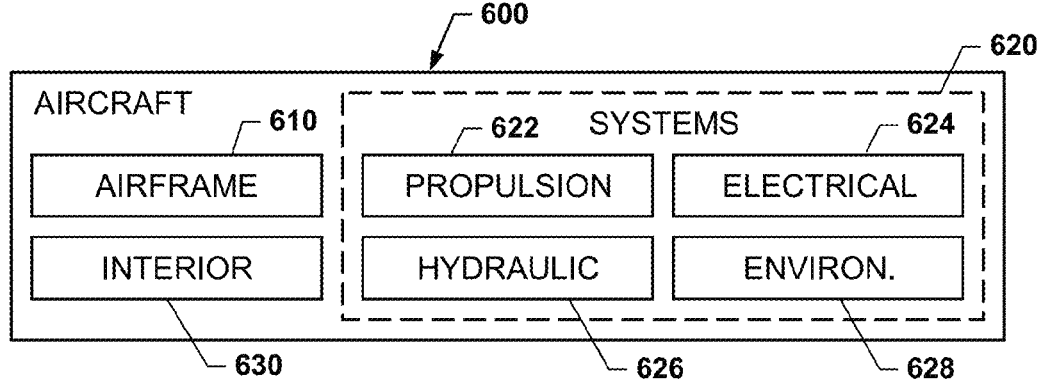
FIG. 6 is a block diagram of an aircraft.

The system 410 can form parts of very long length in the longitudinal (x) direction. If unconsolidated material is feed in pre-pregs from rolls, the part length may be limited by the length of material on that roll. The part may be limited in the z direction by the width of the pre-pregs Embodiments herein may be described in the context of an aircraft manufacturing and an exemplary service method 500 as shown in FIG. 5 and an aircraft 602 as shown in FIG. 6. During pre-production, the method 500 may include specification and design 510 of the aircraft 602 and material procurement 520. During production, component and subassembly manufacturing 530 and system integration 540 of the aircraft 602 takes place. Thereafter, the aircraft 602 may go through certification and delivery 550 in order to be placed in service 560. While in service by a customer, the aircraft 602 is scheduled for routine maintenance and service 570 (which may also include modification, reconfiguration, refurbishment, and so on).

Each of the processes of method 500 may be performed or carried out by a system integrator, a third party, and/or an operator (e.g., a customer). For the purposes of this description, a system integrator may include without limitation any number of aircraft manufacturers and major-system subcontractors; a third party may include without limitation any number of venders, subcontractors, and suppliers; and an operator may be an airline, leasing company, military entity, service organization, and so on.

As shown in FIG. 6, the aircraft 600 produced by exemplary method 500 may include an airframe 610 with a plurality of high-level systems 620 and an interior 630. Examples of the high-level systems 620 include one or more of a propulsion system 622, an electrical system 624, a hydraulic system 626, and an environmental system 628. Any number of other systems may be included. Airframe parts exceeding thirty feet in length may be manufactured by the methods of FIGS. 1 and 2 and the systems of FIGS. 3 and 4. Although an aerospace example is shown, the principles of the invention may be applied to other industries, such as the automotive industry.

The system and methods embodied herein may be employed during any one or more of the stages of the method 500. For example, components or subassemblies corresponding to production process may be fabricated or manufactured in a manner similar to components or subassemblies produced while the aircraft 600 is in service. Also, one or more system embodiments, method embodiments, or a combination thereof may be utilized during the production stages, for example, by substantially expediting assembly of or reducing the cost of an aircraft 600.

The invention claimed is:

1. A method of fabricating a reinforced thermoplastic composite part, the method comprising:
    moving a stack of plies of reinforcing fibers impregnated with thermoplastic resin for sequential operations through separate stations including a consolidation station, a heating station downstream of the consolidation station, and a forming station downstream of the heating station;
    wherein the consolidation station consolidates the stack of plies into a laminate under heat and pressure and softens the thermoplastic resin without causing the resin to flow, the heating station softens the thermoplastic resin without causing the resin to flow, and the forming station imparts a geometry to the laminate to provide the reinforced thermoplastic composite part; and
    wherein the consolidation station, the heating station, and forming station simultaneously operate on different portions of the stack of plies.

2. The method of claim 1, further comprising stacking the plies at a layup station upstream of the consolidation station as a downstream portion of the stack of plies is consolidated at the consolidation station.

3. The method of claim 1, wherein the consolidation station includes upper and lower zones of a plurality of infrared elements that soften the resin.

4. The method of claim 1, wherein the forming is performed with tools that are heated integrally to promote crystallization and ply slippage.

5. The method of claim 4, wherein the forming includes using multi-stage tooling to impart different geometries to the laminate.

6. The method of claim 5, wherein the forming is performed as a multi-shot stamping operation.

7. The method of claim 1, further comprising adding attachment features to the formed portion of the laminate.

8. The method of claim 1, wherein a conveyor belt is used to move the laminate through the stations.

9. The method of claim 8, wherein a flexible polymer film is used as the conveyor belt to carry the laminate as it is moved sequentially through the stations, and wherein the film is peeled from the laminate after forming.

10. The method of claim 1, wherein the forming is performed with a tool that is moved along with the laminate.

11. The method of claim 1, wherein the laminate is formed into an integrally stiffened part having continuous or stretch broken fiber reinforcement.

12. A method comprising:
   moving a ply stack of reinforcing fibers pre-impregnated with thermoplastic resin sequentially through separate consolidating, heating and forming stations with a conveyor belt to form a laminate, the conveyor belt including a flexible polymer film; and
   peeling the polymer film from the laminate after the forming;
   wherein the consolidation station, the heating station, and the forming station simultaneously operate on different portions of the ply stack.

13. The method of claim 12, further comprising stacking plies to create an upstream portion of the ply stack while downstream portions of the ply stack are being consolidated, heated, and formed.

* * * * *